3,734,924
CARBOXAMIDINES
James Whyte Black, Hemel Hempstead, Graham John Durant, Welwyn Garden City, John Colin Emmett, Kimpton, and Charon Robin Ganellin, Welwyn Garden City, England, assignors to Smith Kline & French Laboratories Limited, Welwyn Garden City, England
No Drawing. Filed Oct. 14, 1970, Ser. No. 80,794
Int. Cl. C07d *31/40, 41/18, 49/36, 55/06, 91/32*
U.S. Cl. 260—309       3 Claims

ABSTRACT OF THE DISCLOSURE

N-heterocyclic - alkylcarboxamidines. The compounds inhibit histamine activity.

---

This invention relates to carboxamidine compounds which are pharmacologically active. The compounds of the invention normally exist as the addition salts but, for convenience, reference will be made throughout this specification to the parent compounds.

It has for long been postulated that many of the physiologically active substances within the animal body, in the course of their activity, combine with certain specific sites known as receptors. Histamine is a compound which is believed to act in such a way but, since the actions of histamine fall into more than one type, it is believed that there is more than one type of histamine receptor. The type of action of histamine which is blocked by drugs commonly called "antihistamines" (of which mepyramine is a typical example) is believed to involve a receptor which has been designated by Ash and Schild (Brit. J. Pharmac. Chemother. 27:427, 1966) as H–1. The substances of the present invention are distinguished by the fact that they act at histamine receptors other than the H–1 receptor. Thus they are of utility in inhibiting certain actions of histamine which are not inhibited by the above-mentioned "antihistamines."

The carboxamidine compounds of this invention are represented by the following formula in which it is understood that the structure of the nucleus is such that the bond between the carbon and nitrogen atoms might equally well be represented as a double bond:

FORMULA I

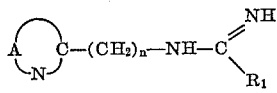

in which:

$n$ is 3 to 5;

A is a chain of 3 to 4 carbon atoms of which 1 to 2 atoms are nitrogen or 1 of which is sulfur in the position $\alpha$ to the carbon atom and the remainder are carbon, which chain forms an unsaturated ring with the carbon and nitrogen atoms to which it is attached and $R_1$ is alkyl having 1 to 4 carbon atoms; phenyl optionally substituted by halogen, hydroxy or nitro; benzyl or lower alkylthio-lower alkyl and pharmaceutically acceptable acid addition salts thereof.

Preferably the ring formed with A and the carbon and nitrogen atoms to which it is attached is 4(5)-imidazolyl.

Most preferably, $n$ is 3 and $R_1$ is methyl; ethyl; phenyl optionally substituted by halogen, hydroxy or nitro; benzyl or methylthiomethyl.

The carboxamidines of Formula I may be prepared by the reaction of an amine of the formula:

FORMULA II

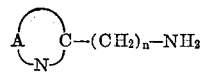

in which $n$ and A have the same significance as in Formula I, with an iminoether of Formula III

FORMULA III

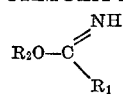

in which $R_1$ has the same significance as in Formula I and $R_2$ is an alkyl group, for example ethyl.

Of the preferred compounds wherein A is such that an imidazol-4(5)-yl ring is formed, the amine starting material of Formula II where $n=3$ may be synthesized from 4(5)-2-chloroethylimidazole; the synthesis of the compound wherein $n=4$ has been described and the compound wherein $n=5$ is prepared from epsilon-aminocaproic acid (as described in Example 10 hereinafter).

As stated hereinabove the carboxamidines of our invention normally exist and are produced as addition salts with acids. Such addition salts include those with hydrochloric, hydrobromic, hydriodic, sulphuric, picric and maleic acids and, as described in a number of the examples hereinafter, the addition salt with one of these acids may readily be converted to that with another. Such conversion may be effected by means of ion-exchange techniques. A particularly useful method which also in many cases effects purification to a sufficient degree to allow the resultant solution of the addition salt to be used for pharmacological estimations involves the formation of the picrate salt and conversion therefrom to the chloride salt.

As stated above, the carboxamidines of Formula I have been found to have pharmacological activity in the animal body as antagonists to certain actions of histamine which are not blocked by "antihistamines" such as mepyramine. For example they have been found to inhibit selectively the histamine-stimulated secretion of gastric acid from the lumen-perfused stomachs of rats anaesthetised with urethane, at doses from 8 to 256 micromoles per kilogram. Similarly, the action of these compounds may, in many cases, be demonstrated by their antagonism to the effects of histamine on other tissues which, according to the above-mentioned paper of Ash & Schild, are not H–1 receptors. Examples of such tissues are perfused isolated guinea-pig heart, isolated guinea-pig right atrium and isolated rat uterus.

The compounds of Formula I may be combined with a pharmaceutically acceptable carrier to form pharmaceutical compositions. Advantageously the composition will be made up in a dosage unit form appropriate to the desired mode of administration. The pharmaceutical carrier employed may be, for example, either a solid or liquid. Exemplary of solid carriers are lactose, terra alba, sucrose, talc, gelatin, agar, pectin, acacia, magnesium stearate, stearic acid and the like. Exemplary of liquid carriers are syrup, peanut oil, olive oil, water and the like. Other pharmacologically active compounds may in certain cases be included in the pharmaceutical compositions.

The invention is illustrated but in no way limited by the following examples.

EXAMPLE 1

Preparation of N-[3-(4(5)-imidazolyl)propyl] acetamidine dihydrochloride

4(5)-(2-chloroethyl)imidazole hydrochloride (200 g.) is dissolved in dimethylformamide (600 ml.) and the solution treated with charcoal and filtered. The filtrate is added gradually to a stirred suspension of sodium cyanide (176 g.) in dimethylformamide (2.25 l.) maintained at 130–135° C. The addition requires 35 minutes and after this time the temperature is maintained at 135° C. for five minutes. After cooling in an ice bath to 10° C., suspended solid is removed by filtration and washed with dimethylformamide. The filtrate is concentrated under reduced pressure and final traces of dimethylformamide are removed with p-xylene (2× 200 ml.). The dry residue is dissolved in distilled water (500 ml.) and charged into a one liter extractor (volume including washings now 750 ml.) and extracted continuously with isopropyl acetate. The extracts are dried over magnesium sulphate, treated with charcoal and concentrated to low bulk. Cooling affords 4(5)-(2-cyanoethyl)imidazole, M.P. 71–74° C. Alternative conditions for the synthesis of 4(5)-(2-cyanoethyl)imidazole are as follows: a solution of 4(5)-(2-chloroethyl)imidazole hydrochloride (136 g.) in water (500 ml.) is added, with stirring, to a solution of sodium cyanide (420 g.) in water (1.65 l.). The resultant mixture is heated at 60–65° C. for 20 hours. After cooling, the solution is treated with charcoal, filtered and concentrated under reduced pressure. The dry residue is extracted with hot ethyl acetate (5 l.) and the extracts are treated with charcoal and concentrated under reduced pressure, affording 4(5)-(2-cyanoethyl)imidazole, M.P. 70–71° C. A pure sample of the base, M.P. 71–73° C., is obtained by recrystallization from isopropyl acetate. A sample of the hydrochloride, M.P. 118–120° C., is obtained by acidification with dry hydrogen chloride in ether.

A solution of 4(5)-(2-cyanoethyl)imidazole (61 g.) in absolute alcohol (600 ml.) is saturated with gaseous ammonia at −20° C. The resultant solution is hydrogenated over Raney nickel catalyst (approximately 4 g.) at 100 atmospheres pressure for four hours at a temperature of 135–145° C. After cooling, filtration and treatment with charcoal, the solution is concentrated under reduced pressure, affording 4(5)-3-aminopropylimidazole as a low melting solid. For purification, the amine (61 g.) is dissolved in a solution of sodium bicarbonate (82 g.) in water (1.6 l.) and N-carbethoxyphthalimide (122 g.) added over 0.5 hour. After stirring for 1.5 hours, the solid is collected, washed with water and dried. Recrystallization from aqueous ethanol yields 4(5)-(3-phthalimidopropyl)imidazole. A pure sample obtained by further recrystallization from aqueous ethanol has M.P. 160–162° C.

Hydrolysis with 5 N hydrochloric acid for 16 hours followed by removal of phthalic acid yields 4(5)-3-aminopropylimidazole dihydrochloride, M.P. 156–158° C. (from ethanol-ether). Treatment with sodium ethoxide in ethanol yields pure 4(5)-(3-aminopropyl)imidazole.

Ethyl acetimidate hydrochloride (3.95 g.) is added rapidly to a mixture of di-n-butyl ether (25 ml.) and a solution of potassium carbonate (4.4 g.) in water (15 ml.). After shaking briefly, the organic layer is separated, dried over sodium sulphate and filtered. A solution of 4(5)-(3-aminopropyl)imidazole (2.0 g.) in dry ethanol (25 ml.) is added to the filtrate and the resultant solution is allowed to stand at room temperature for seven days. The solution is then filtered, concentrated and acidified with ethanolic hydrogen chloride to give a hygroscopic solid. Recrystallization from ethanol-ether with filtration in a dry atmosphere affords N-[3-(4(5)-imidazolyl)propyl]acetamidine dihydrochloride, M.P. 122–128° C.

EXAMPLE 2

Preparation of N-[3-(4(5)-imidazolyl)propyl] propionamidine dipicrate

The reaction of 4(5)-(3-aminopropyl)imidazole (1.8 g.) with ethyl propionimidate hydrochloride (4.0 g.) according to the method described in Example 1, followed by the addition of picric acid affords N-[3-(4(5)-imidazolyl)propyl]propionamidine as the dipicrate, M.P. 150–152° C. (from nitromethane-ethanol).

EXAMPLE 3

Preparation of N-[3-(4(5)-imidazolyl)propyl]phenylacetamidine dihydrochloride

The reaction of 4(5)-(3-aminopropyl)imidazole (2.0 g.) with ethyl phenylacetimidate hydrochloride (7.5 g.) according to the method described in Example 1 affords N-[3 - (4(5)-imidazolyl)propyl]phenylacetamidine dihydrochloride, M.P. 227.5–230.5° C. (from isopropyl alcohol-ethanol-tetrahydrofuran).

EXAMPLE 4

Preparation of N-[3-(4(5)-imidazolyl)propyl]benzamidine dihydrochloride

The reaction of 4(5)-(3-aminopropyl)imidazole (2.0 g.) with ethyl benzimidate hydrochloride (7.1 g.) according to the method described in Example 1 affords N-[3-(4(5) - imidazolyl)propyl]benzamidine dihydrochloride, M.P. 221–223° C. (from ethanol-tetrahydrofuran).

EXAMPLE 5

Preparation of N-[3-(4(5)-imidazolyl)propyl]-2-(methylthio)acetamidine dipicrate The reaction of 4(5)-(3-aminopropyl)imidazole (1.8 g.) with ethyl 2-methylthioacetimidate hydrochloride (4.9 g.) according to the method described in Example 1, followed by the addition of picric acid affords N-[3-(4(5)-imidazolyl)propyl]-2-(methylthio)acetamidine dipricrate, M.P. 116–117° C. (from nitroethane-ether).

EXAMPLE 6

Preparation of N-[3-(4(5)-imidazolyl)propyl]-p-chlorobenzamidine dihydrochloride The reaction of 4(5)-(3-aminopropyl)imidazole (2.0 g.) with ethyl p-chlorobenzimidate hydrochloride (7.0 g.) according to the method described in Example 1 affords N-[3 - (4(5)-imidazolyl)propyl]-p-chlorobenzamidine dihydrochloride, M.P. 278–280° C. (from methanol-ethanol).

EXAMPLE 7

Preparation of N-(3-(4(5)-imidazolyl)propyl)-p-nitrobenzamidine dihydrochloride

The reaction of 4(5)-(3-aminopropyl)imidazole (2.0 g.) with ethyl p-nitrobenzimidate hydrochloride (7.3 g.) according to the method described in Example 1 affords N - (3-(4(5)-imidazolyl)-propyl)-p-nitrobenzamidine dihydrochloride, M.P. 304–305° C. (from methanol-tetrahydrofuran).

EXAMPLE 8

Preparation of N-(3-(4(5)-imidazolyl)propyl)-p-hydroxybenzamidine dihydrochloride The product is prepared by the reaction of 4(5)-(3-aminopropyl)imidazole with ethyl p-hydroxybenzimidate hydrochloride according to the method described in Example 1.

EXAMPLE 9

Preparation of N-(4-(4(5)-imidazolyl)butyl) acetamidine dihydrochloride

The reaction of 4(5)-(4-aminobutyl)imidazole (2.26 g.) with ethyl acetimidate hydrochloride (3.95 g.) according to the method described in Example 1 afforded N - (4-(4(5)-imidazolyl)butyl)acetamidine dihydrochloride (2.2 g.), M.P. 182.5–185° (from isopropyl alcohol).

EXAMPLE 10

Preparation of N-(5-(4(5)-imidazolyl)pentyl)-acetamidine dihydrochloride (i) A mixture of 1-bromo-7-phthalimidoheptan-2-one (60.0 g.) (obtainable from epsilon-aminocaproic acid)

and formamide (360 ml.) was heated at 180–185° for 2 hours. Following removal of excess formamide by distillation under reduced pressure, the residue was hydrolysed by heating (under reflux) with 5 N hydrochloric acid 1.8 l.) for 18 hours. After cooling to 0° and filtration to remove phthalic acid, the filtrate was concentrated under reduced pressure and the residue extracted with hot ethanol and again concentrated. The residual amine hydrochloride was converted to the free base by passage down Amberlite ion-exchange resin IRA 401 (OH⁻) and elution with methanol. The base obtained was converted into the picrate with picric acid (82.5 g.) in water. The picrate was recrystallised several times from water affording 4(5) - (5 - aminopentyl)imidazole dipicrate (55 g.) M.P. 209–211°. An analytically pure sample had M.P. 210–211° (from nitromethane). (Found: C, 39.2; H, 3.3; N, 20.3%. $C_8H_{15}N_3 \cdot 2C_6H_3O_7$ requires: C, 39.3; H, 3.5; N, 20.6%.)

The picrate was treated with hydrochloric acid in the usual way yielding the amine dihydrochloride (24.6 g.) which was finally converted to 4(5)-(5-aminopentyl)imidazole (15.3 g.), M.P. 45–8° by passage down ion-exchange resin Amberlite IRA–401 (OH⁻).

The reaction of 4(5)-(5-aminopentyl)imidazole (2.0 g.) with ethyl acetimidate hydrochloride (3.95 g.) according to the method described in Example 1 afforded N-(5-(4(5) - imidazolyl)pentyl)acetamidine dihydrochloride, M.P. 197–198.5.

EXAMPLE 11

Preparation of N-[3-(3-(1,2,4-triazolyl)propyl] acetamidine dihydrochloride

The product is prepared by the reaction of 3-(3-aminopropyl)-1,2,4-triazole (prepared from the hydrochloride by refluxing with potassium hydroxide in anhydrous ethanol) with ethyl acetimidate hydrochloride according to the method described in Example 1.

EXAMPLE 12

Preparation of N-[3-(2-pyridyl)propyl]acetamidine dihydrochloride

2 - (2 - cyanoethyl)pyridine is reduced with lithium aluminum hydride in ether, in the normal way, yielding 2-(3-aminopropyl)pyridine, B.P. 77° C./0.4 mm. (Dihydrochloride, M.P. 175–177° C.)

Reacting 2-(3-aminopropyl)pyridine with ethyl acetimidate hydrochloride according to the method described in Example 1 gives the product.

EXAMPLE 13

Preparation of N-[3-(3-pyrazolyl)propyl] acetamidine hydrochloride

Aluminum chloride (43 g.) is added to a stirred solution of 4-phthalimidobutyryl chloride (36.2 g.) in 1,1,2,2-tetrachloroethane (400 ml.), previously saturated with acetylene. Acetylene is bubbled through the solution overnight, with stirring, and the reaction mixture is then decomposed by the addition of crushed ice (300 g.). The organic layer is separated and the aqueous layer extracted with 1,1,2,2-tetrachloroethane (3× 100 ml.). The combined organic solution is dried over sodium sulphate and concentrated. The residual solid is recrystallized from hexane affording 1-chloro-6-phthalimidohex-1-en-3-one, M.P. 92° C.

This is immediately caused to react with hydrazine hydrate (19.2 g.) at 95° C. for 10 minutes. Following concentration, the residue is extracted with ether in a Soxhlet apparatus for three days. Concentration of the ether extract affords 3-(3-aminopropyl)pyrazole.

The dipicrate has M.P. 194° C. (from nitromethane).

The product is prepared by reacting 3-(3-aminopropyl)pyrazole with ethyl acetimidate hydrochloride according to the method described in Example 1.

EXAMPLE 14

Preparation of N-[3-(2-thiazolyl)propyl] acetamidine hydrochloride

A mixture of 3-phthalimidothiobutyramide (15.0 g.) and bromoacetaldehyde diethyl acetal (19.7 g.) is heated at 100° C. with frequent agitation for two hours. The solid mass is extracted with hot ethanol, and the extracts are treated with charcoal and filtered. On cooling crystals are deposited. These are dissolved in water (50 ml.) and the solution washed with ether (25 ml.) and diluted with aqueous sodium acetate to pH 6. A yellowish-brown solid crystallizes out which is collected and washed with water yielding 3-(2-thiazolyl)propylphthalimide hydrobromide, M.P. 67–70° C. The phthalimido derivative (5.0 g.) is dissolved in ethanol (50 ml.), hydrazine hydrate (2 ml.) is added and the solution heated under reflux for two hours. The solvent is removed under reduced pressure and the residue is dissolved in concentrated hydrochloric acid (30 ml.) and heated under reflux for one hour. After cooling, phthalhydrazide is removed by filtration and the filtrate evaporated to dryness. The residue is recrystallized from methanol-ether yielding 3-(2-thiazolyl)propylamine dihydrochloride, M.P. 160–165° C.

The product is prepared by reacting 3 - (2 - thiazolyl) propylamine (prepared from the amine dihydrochloride by reaction with aqueous sodium hydroxide and extraction with ethyl acetate) with ethyl acetimidate hydrochloride according to the method described in Example 1.

What is claimed is:

1. A pharmaceutically acceptable acid addition salt of a compound of the formula:

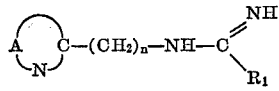

in which:

$n$ is 3 to 5;

A taken together with the carbon and nitrogen atoms shown forms a 4(5)-imidazolyl, 2-thiazolyl, 3-(1,2,4-triazolyl), 3-pyrazolyl or 2-pyridyl ring; and $R_1$ is alkyl having 1 to 4 carbon atoms; phenyl optionally monosubstituted by halogen, hydroxy or nitro; benzyl or lower alkylthio-lower alkyl.

2. A compound according to claim 1 in which the ring formed by A taken together with the carbon and nitrogen atoms shown is 4(5)-imidazolyl.

3. A compound according to claim 1 in which $n$ is 3 and $R_1$ is methyl; ethyl; phenyl optionally monosubstituted by halogen, hydroxy or nitro; benzyl or methylthiomethyl.

References Cited

Laborit et al.: Chem. Abst., vol. 70, articles 76170w and 76171x (Apr. 28, 1969).

HARRY I. MOATZ, Primary Examiner

U.S. Cl. X.R.

260—250 R, 294.8, 296 R, 306.8 R, 308 R; 424—249, 250, 263, 270, 273

PO-1050
(5/69)

UNITED STATES PATENT OFFICE
CERTIFICATE OF CORRECTION

Patent No. 3,734,924          Dated May 22, 1973

Inventor(s) James Whyte Black, Graham John Durant, John Colin Emmett and Charon Robin Ganellin It is certified that error appears in the above-identified patent and that said Letters Patent are hereby corrected as shown below:

Column 1, between lines 8 and 9, insert the following:

Claims priority, application Great Britain, October 29, 1969, 52891/69

Signed and sealed this 17th day of September 1974.

(SEAL)
Attest:

McCOY M. GIBSON JR.
Attesting Officer

C. MARSHALL DANN
Commissioner of Patents